No. 808,221. PATENTED DEC. 26, 1905.
C. G. SIMONDS.
SPEED CHANGING GEAR.
APPLICATION FILED AUG. 27, 1904.
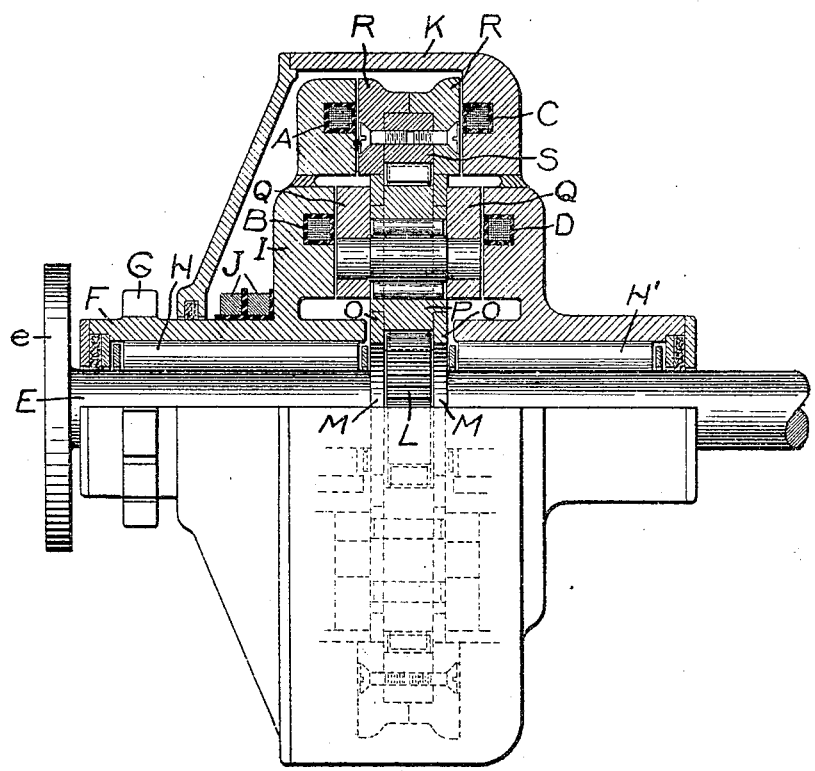
Witnesses.
Jonathan E. Briggs.
Helen Oxford.
Inventor:
Charles G. Simonds
by Albert M. Davis
Att'y.

UNITED STATES PATENT OFFICE.

CHARLES G. SIMONDS, OF SCHENECTADY, NEW YORK, ASSIGNOR TO GENERAL ELECTRIC COMPANY, A CORPORATION OF NEW YORK.

SPEED-CHANGING GEAR.

No. 808,221.     Specification of Letters Patent.     Patented Dec. 26, 1905.

Application filed August 27, 1904. Serial No. 222,374.

*To all whom it may concern:*

Be it known that I, CHARLES G. SIMONDS, a citizen of the United States, residing at Schenectady, county of Schenectady, State of New York, have invented certain new and useful Improvements in Speed-Changing Gears, of which the following is a specification.

My invention relates to electromagnetically-controlled speed-changing devices; and its object is to provide a novel form of electromagnetic speed changing and reversing gear which, while efficient in action, is particularly simple and compact in construction, and consequently especially applicable for use in automobiles.

My invention will best be understood by reference to the accompanying drawing, which shows a side view, partly in cross-section, of a speed-changing gear arranged in accordance with my invention.

In the drawing, E represents the driving-shaft, which may be secured to the engine or other source of power by the flange *e*.

F represents the driven member, which is shown as a sleeve mounted on the driving-shaft E through the roller-bearing formed by the rollers H. The sleeve F is provided with a gear or pinion G for delivering the power to the load. The sleeve F carries a flange I, in which are embedded the two magnet-windings A and B, which are supplied with current by means of the collector-rings J.

K represents the casing of the gear, which is stationary and completely incloses the moving parts with the exception of the flange *e* and the driving-gear G. Casing K furnishes a bearing for shaft E through the rollers H' and also carries two windings C and D. Mounted on the central portion of the driving-shaft E are two rings M M and the gear L. The rings M M serve as a track for a pair of rollers O O, which carry a planetary gear or pinion P, meshing with the gear L. If the diameter of the rings M M is made equal to the pitch diameter of the gear L, it is evident that the rollers O O will roll on the rings M M without any slipping or friction losses.

Although I have shown only one pinion P and its rollers O O, it will be understood that there are one or more similar pinions with their rollers distributed around the driving-shaft, as indicated in dotted lines.

Q Q represent a ring-shaped member or members concentric with shaft E and supported by the axes or shafts of the planetary pinions P and connecting the planetaries to each other.

R R represent another ring-shaped member or members concentric with the shaft E, formed with inner surfaces adapted to be supported on the rollers O O and to serve as a second track for the rollers. The rings R R carry the internal gear S, meshing with the planetary gear P. The internal diameter of the rings R R, upon which the rollers O O roll, is made equal to the pitch diameter of the internal gear. Consequently there is no slipping between the rollers O O and the rings R R. The rings R R serve as armatures for the two magnet-coils A and C, by means of which the rings, and consequently the internal gear S, may be locked either to the driven member F or to the stationary casing K. Similarly the rings Q Q serve as armatures for the magnet-windings B and D, by means of which the rings Q Q may be locked either to the driven member F or to the stationary casing K.

The operation is then as follows: For the slow speed forward the clutches C and B are energized. The internal gear S is then held stationary, locked to the frame, while the rings Q Q are locked to the driven member F. Since the internal gear S is stationary, the rotation of shaft E must cause the gear P to travel around shaft E as an ordinary planetary gear in the direction in which shaft E is rotating and at a speed depending upon the relative gear ratios of L and S. The driven member F is consequently driven at the speed determined by the gear ratio, since the rings Q Q are locked to member F. For the high speed the magnet-windings A and B are energized. This locks both the internal gear S and the rings Q to the driven member. Consequently there can be no relative movement between pinion P and gear S. Therefore the gears act as a rigid connection between the shaft E and the sleeve F and the sleeve F is rotated at the engine speed. In order to reverse, magnet-windings A and D are energized. This locks the internal gear S to the driven member and locks ring Q to the stationary casing. The axes of the pinions P are consequently held stationary, and these pinions act as idlers between the gear L and the internal gear S. Gear S is consequently driven in the opposite direction to that of gear L at a speed depending upon the gear ratio.

Thus two speeds forward and one reverse are obtained with the arrangement of gears shown. For the small types of automobiles this number of gears is sufficient, and the compact arrangement of gearing adapts it for use with such machines. For large machines, however, requiring a greater number of speeds, the requisite speeds may be readily obtained by connecting two such gears as are shown in series.

Changes may be made in the construction and arrangement of parts, and I aim in the appended claims to cover all modifications which are within the scope of my invention.

What I claim as new, and desire to secure by Letters Patent of the United States, is—

1. In a speed-changing gear, a driving-shaft, a pinion thereon, a planetary gear engaging said pinion, a revolubly-mounted internal gear concentric with said pinion and engaging said planetary gear, a driven member, and magnetic clutches adapted and arranged to hold either said internal gear or the axis of said planetary gear stationary and to lock either or both to said driven member.

2. In a speed-changing gear, a driving-shaft, a pinion thereon, a plurality of planetary gears engaging said pinion, a ring-shaped member surrounding said shaft and supported on the axes of said gears, a revolubly-mounted internal gear engaging said planetary gears, a driven member, and magnetic clutches adapted and arranged to hold either said internal gear or said ring-shaped member stationary and to lock either or both to said driven member.

3. In a speed-changing gear, a shaft, a pinion thereon, two rings on opposite sides of said pinion of a diameter equal to the pitch diameter of said pinion, a plurality of planetary gears engaging said pinion, a pair of rollers for each gear adapted to roll on the first-named rings and supporting the gears, an internal gear meshing with the several planetary gears, supporting-rings for said internal gear bearing on said rollers and of a diameter equal to the pitch diameter of the internal gear, a driven member, and means for holding either said internal gear or the axes of said planetary gears stationary and for locking either or both to said driven member.

4. In a speed-changing gear, a shaft, a pinion thereon, two rings on opposite sides of said pinion of a diameter equal to the pitch diameter of said pinion, a plurality of planetary gears engaging said pinion, a pair of rollers for each gear adapted to roll on the first-named rings and supporting the gears, an internal gear meshing with the several planetary gears, supporting-rings for said internal gear bearing on said rollers and of a diameter equal to the pitch diameter of the internal gear, a ring-shaped member surrounding the driving-shaft and supported on the axes of said planetary gears, a driven member, and magnetic clutches adapted and arranged to hold either said member or said internal gear stationary or to lock either or both to said driven member.

5. In a speed-changing gear, a driving-shaft, a pinion thereon, a planetary gear engaging said pinion, a revolubly-mounted internal gear concentric with said pinion and engaging said planetary gear, a driven member, a stationary casing, two magnetic clutches carried by said casing and adapted to lock said internal gear and the axis of said planetary gear respectively to said casing, a driven member, and two magnetic clutches carried thereby and adapted to lock said internal gear and the axis of said planetary gear respectively to said driven member.

In witness whereof I have hereunto set my hand this 25th day of August, 1904.

CHARLES G. SIMONDS.

Witnesses:
BENJAMIN B. HULL,
HELEN ORFORD.